United States Patent [19]

Hoffman et al.

[11] Patent Number: 5,340,954
[45] Date of Patent: Aug. 23, 1994

[54] WIRELESS MULTIPLE POSITION SWITCHING SYSTEM

[75] Inventors: Miles K. Hoffman, South Bend, Ind.; Brad Jenson, Berrien Spring, Mich.; Klaus Wieder, Helenville, Wis.

[73] Assignee: Heath Company, Benton Harbor, Mich.

[21] Appl. No.: 26,392

[22] Filed: Mar. 4, 1993

Related U.S. Application Data

[62] Division of Ser. No. 694,649, May 24, 1991, Pat. No. 5,239,205.

[51] Int. Cl.⁵ .............................................. H01H 21/40
[52] U.S. Cl. ................... 200/277.2; 307/113; 307/125; 307/116; 200/339
[58] Field of Search ............... 307/116, 113, 121, 125, 307/139, 117, 125, 139; 200/6 R, 6 A, 533, 6 C, 6 B, 6 BB, 277.2, 339, 400

[56] References Cited

U.S. PATENT DOCUMENTS

| | | | |
|---|---|---|---|
| 4,031,345 | 6/1977 | Garcia | 200/67 AA |
| 4,439,649 | 3/1984 | Cecchi | 200/6 A |
| 5,095,181 | 3/1992 | Osika et al. | 200/43.16 |
| 5,158,172 | 10/1992 | Roeser et al. | 200/553 |

*Primary Examiner*—A. D. Pellinen
*Assistant Examiner*—Aditya Krishnan
*Attorney, Agent, or Firm*—Charles W. MacKinnon; Scott B. Dunbar

[57] ABSTRACT

A wireless multiple position switching system is disclosed for controlling the application of power to a load device from a plurality of remote locations. The switching system includes a power source, a load device, a master toggle switch and one or more slave toggle switches. A slave toggle switch generates an electromagnetic switching signal which changes the state of the master switch. The master switch is connected in series with the power source and the load device and controls the application of power to the load device in response to the switching signal from the slave switch or actuation of its own toggle.

7 Claims, 9 Drawing Sheets

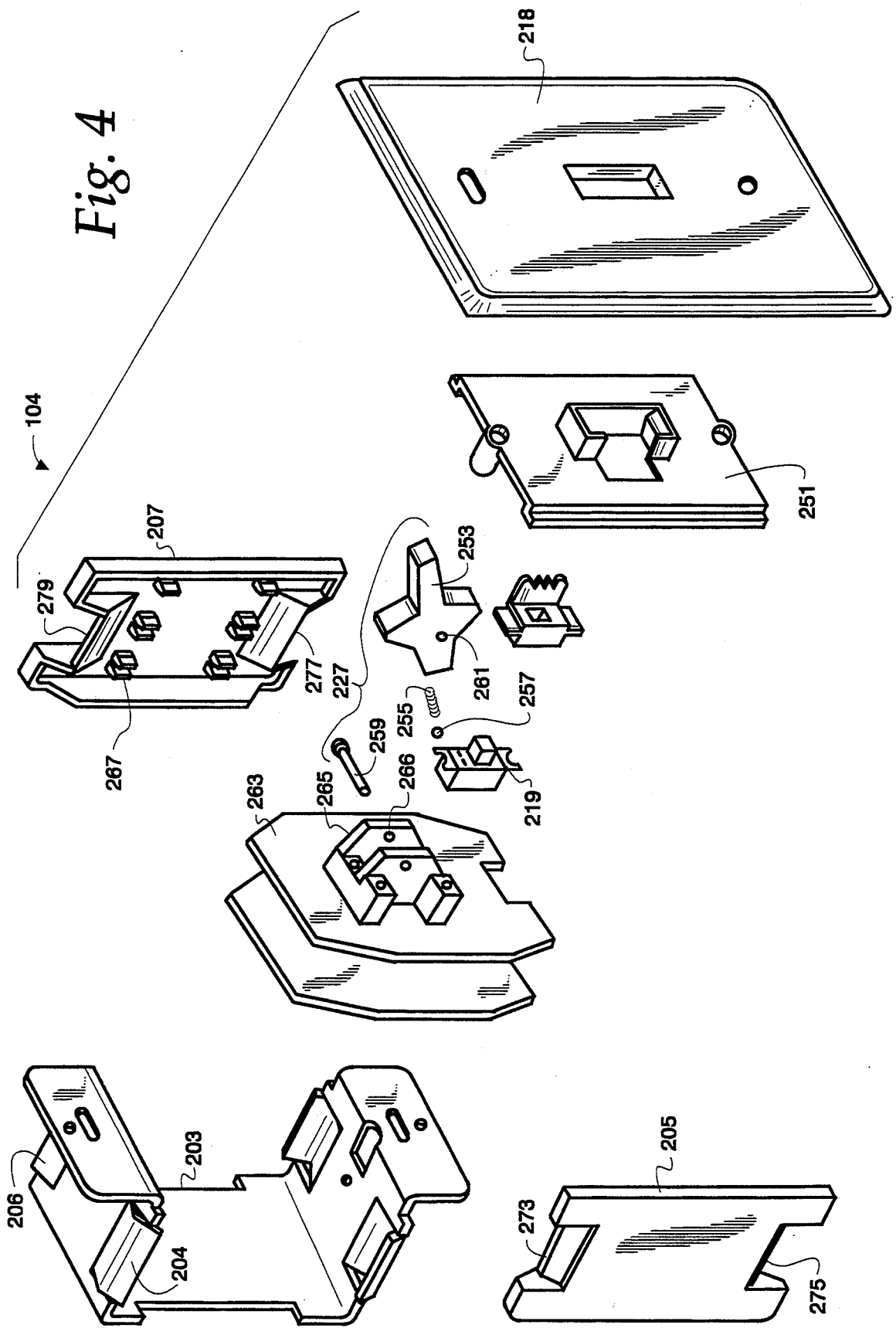

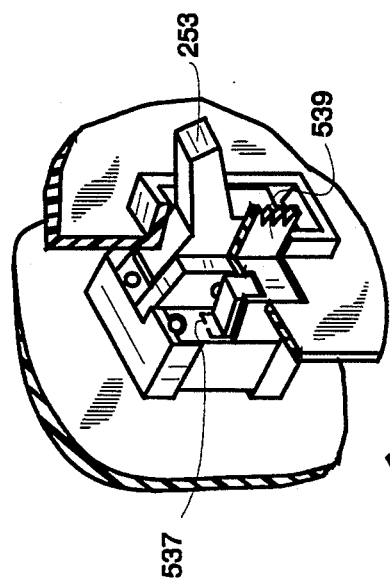
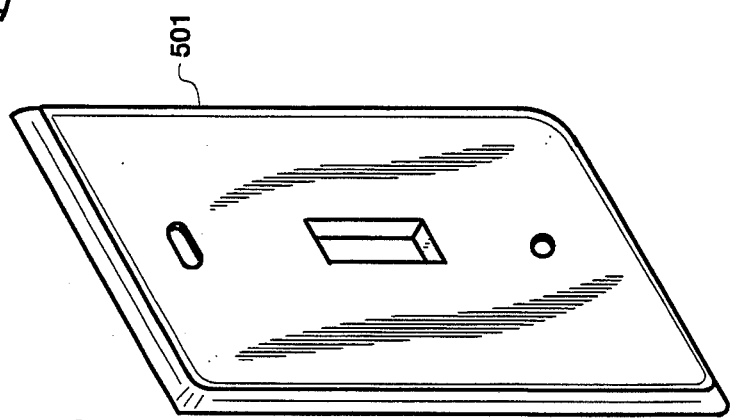
Fig. 6
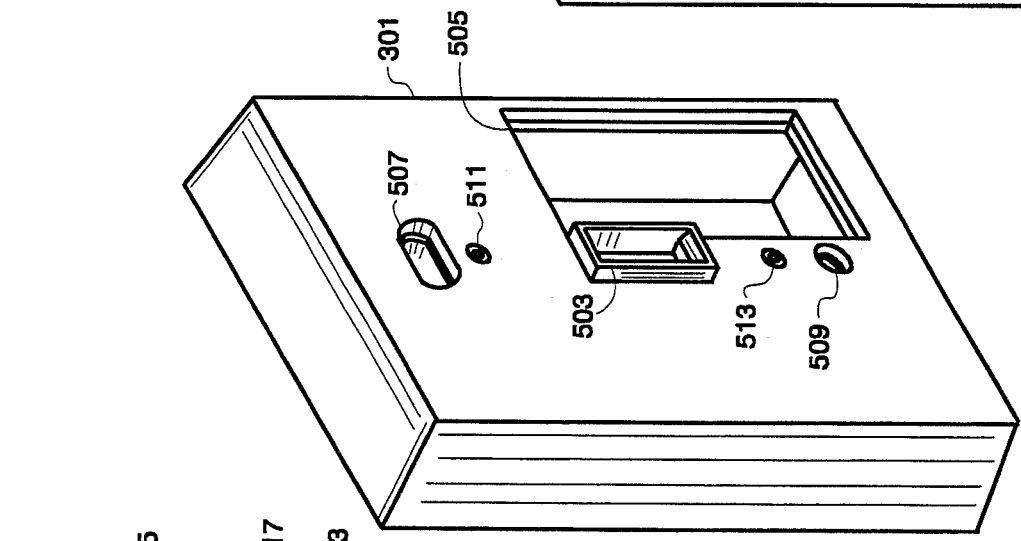
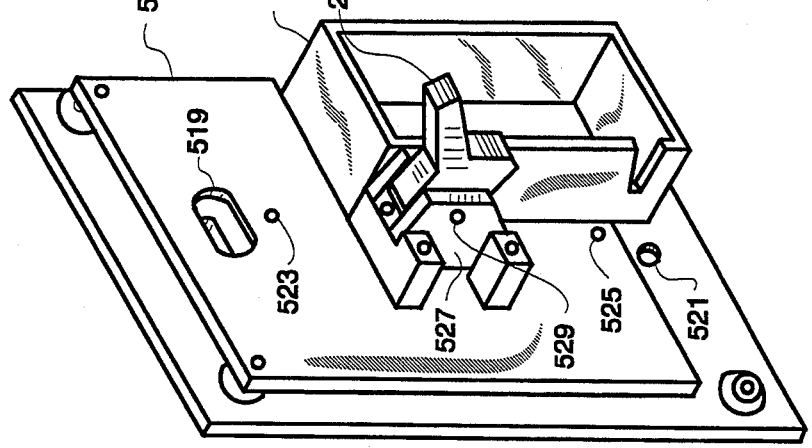
Fig. 5

WIRELESS MULTIPLE POSITION SWITCHING SYSTEM

This is a division of U.S. Ser. No. 07/694,649, filed May 24, 1991 now U.S. Pat. No. 5,239,205.

GENERAL

This invention pertains generally to a remote-controlled switching system and is more particularly directed to a wireless multiple position switch which is operable from a plurality of locations.

Hard-wired switching systems which are operable from a plurality of locations to cause switching of a given electrical circuit are well known. Such systems generally employ a combination of three- and four-way switches connected in series with one another such that the operation of any of the switches will reverse the energization state of the load between an "on" state and an "off" state. The switches may be adapted for mounting inside a standard electrical junction and must be hard-wired to any remaining switches which control the load device of the electrical circuit. Typical load devices include incandescent lamps, ceiling fans, and/or electrical appliances. The load device may be controlled indirectly by means of a switched electrical outlet, or directly by means of a switched wire.

In switching systems of this type, all switch contacts at all locations must be rated to carry the full load current. Furthermore, all wiring must carry the full load current. For example, No. 12 copper wire is commonly used for installations which carry from 15 to 20 amperes of load current. Generally, a minimum of three wires are required at each switch location.

The requirement that the switches be hard-wired to one another presents difficulties if one or more additional remote switching locations are to be added to a preexisting system. Oftentimes, an existing system contains a conventional two-way switch providing for the control of a load from only one location. Therefore, holes frequently must be cut into walls to accommodate an electrical junction boxes so that the new switch or switches may be mounted. Local building codes and regulations often place severe restrictions upon the manner in which the new switch shall be connected to the existing circuitry. In some cases, conduit must be used to connect the existing circuit to the new junction box. Other jurisdictions permit the use of metallic sheathed cable such as B-X cable or greenwall, which is easier to work with than rigid conduit. But even in areas permitting the use of double insulated multiconductor cable, oftentimes referred to as ROMEX, the cable must be routed through walls, floors and ceilings. The job is generally very tedious, time-consuming and costly. What is needed is a remote-controlled wireless multiple position switching system that can be easily incorporated into an existing circuit without the need for routing conduit, cable or wire through walls. Since the existing circuit may contain a conventional two-way switch providing for the control of a load from one location, the switching system should provide means for controlling the load from one or more additional locations without the need for extra wiring.

SUMMARY OF THE INVENTION

The invention provides a multiple position switching system for changing the energization state of a load device from a plurality of remote locations. The system includes a power source, a load device, a slave switch and a master switch. The slave switch is used to revise the energization state of a load device and includes a switching signal generator which generates electromagnetic switching signals or direct current switching signals. The slave switch provides switching signal activation means which activates the switching signal generator. The master switch is responsive to the switching signal to reverse the energization state of the load device whenever the switching signal is received. The master switch is connected in series with the power source and the load device.

The invention also provides an improved two-position switch. The switch includes a ball-bearing having an electrically conductive surface, a compression spring, a set of electrical contacts, and a toggle lever for activating the switch. The toggle lever has a first stable resting position and a second stable resting position. The switch is activated by moving the toggle lever from the first position to the second position. The switch is also activated by moving the toggle lever from the second position to the first position. The toggle lever contains an aperture for accommodating the compression spring. The spring applies a force to the ball-bearing such that the ball-bearing momentarily rests across the set of contacts when the switch is activated, momentarily completing an electrical circuit across a set of contacts.

These and other objects, features and aspects of the invention will be readily apparent and more fully described upon reading the following detailed description in conjunction with the appended drawings wherein:

BRIEF DESCRIPTION OF THE DRAWINGS

FIG. 4 is an exploded assembly view of the master switch shown in FIG. 2;

FIG. 5 is an exploded assembly view of the slave switch shown in FIG. 3;

FIG. 6 is an exploded isometric view of the system disconnect switch and the toggle switch included in the master switch unit shown in FIG. 2;

DETAILED DESCRIPTION OF THE PREFERRED EMBODIMENTS

Figures 1, 2, 3:
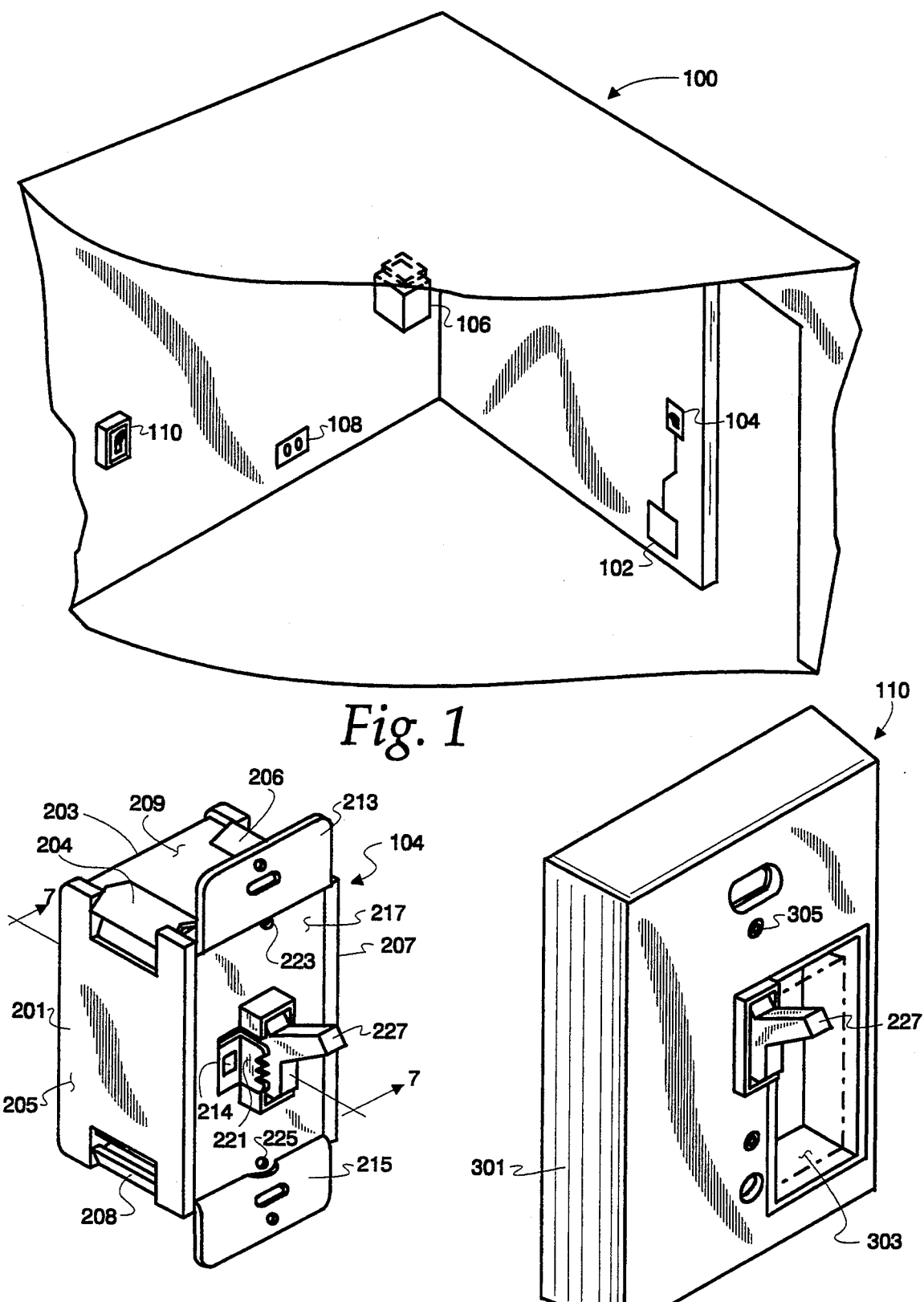
FIG. 1 is a representative pictorial view of a typical installation for the multiple position wireless switching system of the present invention.
FIG. 2 is an isometric view of the master switch of the multiple position wireless switching system.
FIG. 3 is an isometric view of the slave switch of the multiple position wireless switching system.

The wireless multiple position switch consists of two components, a master switch and a slave switch.

The master switch and the slave switch each contain a switching mechanism which is designed to have the appearance and operational feel of a conventional household 120-VAC wall-mounted light switch. Unlike conventional switches, the mechanism of the present invention carries low-voltage DC, which is used to trigger a 120-VAC electronic switch located in the master switch and having no mechanical contacts. The switching mechanism has the electrical characteristics of a conventional momentary-contact toggle switch. The contacts are normally open, but when the mechanism is activated, the contacts are closed for a brief interval of time. The toggle switch is activated by moving a toggle lever from a first stable resting position to a second stable resting position, or vice versa. Plastic parts may be used to fabricate the switching mechanism, with the exception of the contacts and the ball bearing. The contacts and the ball bearing should be fabricated from electrically conductive material.

The master switch contains a receiver and is designed to be used in place of a standard, two-way, two- or three-wire home light switch. Accordingly, the master switch operates on standard 120-VAC power. The slave switch contains a transmitter, has the appearance of a home light switch, but requires no wiring. The slave (transmitter) communicates to the master (receiver) the information required to cause the master (receiver) switch to alternate its state. The master switch is wired in series between a power source and a load device. Reception frequencies are selected to match the transmitting frequencies of the slave switches. The system is designed so that any number of slave (transmitter) units can be installed, each with the capacity to independently trigger a master switch. The function of the system is to emulate the operation of a conventional three-way (or multiple-way) switching system without having to run wires between the master and slave switches.

This system may be adapted to employ a plurality of transmitter/receiver systems. However, if more than one wireless multiple position switching system is used in a given dwelling, switches with different frequency ratings must be used. Otherwise, the switching systems will interact with one another such that the load controlled by a first wireless switching system might be intermittently triggered by other switching systems in use. Each wireless multiple position switch should be labelled with a channel number corresponding to a given frequency. This may be accomplished by means of stickers positioned on the packaging to enable the user to select systems which will not interact with one another. The system includes circuitry to guard against false actuations.

The master switch contains a system disconnect switch which allows the system to be switched off for an indefinite period of time. Non-metallic wall plates must be used with the master and slave units, because metal wall plates will interfere with electromagnetic wave propagation, significantly reducing the operational range of the system in some cases. The unit is certified under FCC Part 15 and Underwriter's Laboratories. 500 watt switching capacity is provided. The minimum lighting load is 25 watts, incandescent only, and the maximum lighting load is 500 watts, incandescent only. The typical range is up to 50 feet, and the physical dimensions permit mounting in a standard electrical junction box. The slave switch provides a battery life of about one year with a standard 9-volt cell.

The wireless multiple position switch is ideal for household use, for example, in family rooms, dens, dining rooms, hallways, bedrooms, basements, utility rooms, and other places where convenient light control is desired. However, the system will not work with fluorescent lights, lights with fans, or other appliances.

The switching system provides a relatively simple installation procedure, which is readily implemented by a typical homeowner or layman having no special skills. The only tool needed to install the switching system is a flat-bladed screwdriver. A wall switch location that controls an outlet to a lamp or overhead incandescent light is selected. The total lighting load must not exceed 500 watts. The master switch must be able to easily detect the signals from the slave switch in the room or hallway where the system is installed so that the system will operate properly. Large metal objects should not be situated between the two switches. Otherwise, the switching signals may be attenuated, substantially reducing the operational range of the system. FIG. 1 is a representative pictorial view of a typical installation for the multiple position wireless switching system 100 of the present invention. A power source 102 provides standard 117-volt alternating current for the switching system 100. A master switch 104 is connected in series with the power source 102 and a load device 106. Load device 106 may be a light fixture hardwired to a pre-existing electrical system. Alternatively, the load device may be connected to the switching system by means of a standard switch wall outlet 108. A slave switch 110 is placed at a desired remote switching location. However, to ensure reliable switching system performance, the master switch and the slave switch 104, 110 should not be physically separated by more than about 50 feet. Large metal objects situated between the master switch 104 and the slave switch 110 may interfere with the proper functioning of switching system 100. The slave switch 110 contains a transmitter which generates a switching signal comprised of electromagnetic radiation. The switching signal is generated whenever the slave switch 110 is activated.

The master switch 104 may be activated in one of two ways. First, the switch may be a triggered response to the receipt of a switching signal from the slave switch 110. Additionally, the master switch 104 may be manually activated by a system user as desired. Upon activation, the master switch 104 reverses the energization state of the load device 106.

The switching signal transmitted by the slave switch 110 and received by the master switch 104 consists of electromagnetic radiation. The switching signal may be modulated, or, alternatively, an open carrier may be employed. Virtually any desired frequency may be selected for the switching signal; operation over a broad range of frequencies is possible from the ultrasonic region of the spectrum through ultraviolet light. However, the preferred embodiment uses signals in the range of approximately 300 mHz. This frequency range is desirable because it is situated in a relatively quiet area of the spectrum between TV channels 13 and 14, thus rendering interference between the switching system 100 and other services highly unlikely.

FIG. 2 illustrates a detailed isometric view of the master switch shown in FIG. 1. The master switch 104 is housed in an outer enclosure 201 of dimensions sufficiently small to permit mounting of the master switch 104 in a standard electrical junction box. The outer enclosure 201 may consist of a back plate 203 and two side members 205, 207. The back plate 203A contains spring elements 204, 206, 208 for securing two side members 205, 207. The back plate 203 may be contoured to form a top plate 209 and a bottom plate for the outer enclosure 201. The back plate 203 may be further contoured to provide a plurality of mounting tabs 213, 215 for mounting the outer enclosure 201 in a standard electrical junction box.

The master switch 104 includes a front plate 217, a system disconnect switch 219, and system disconnect switch linkage 221. The plate 217 includes a plurality of holes 223, 225, permitting the mounting of a standard or decorative non-metallic cover plate. System disconnect switch 219 allows the switching system operator to remove all power from the switching system. The master switch 104 is activated by means of toggle switch 227. Toggle switch 227 is designed to have the look and the feel of a standard two-way or three-way switch. However, unlike conventional three-way switches which have two sets of contacts, the toggle switch 227 contains one set of contacts which is normally open. When activated, the contacts are shorted out momentarily and then remain open until the toggle switch 227 is activated again.

FIG. 3 is a detailed isometric view of the slave switch 110. The slave switch 110 may be affixed to a wall at a desired control location by means of screws, fasteners, tape or other adhesive means. The slave switch 110 includes a front enclosure 301, a battery compartment 303, a toggle switch 227 and mounting means 305 for mounting a standard or decorative non-metallic cover plate to the front enclosure 301.

FIG. 4 is an exploded assembly view of the master switch 104 shown in FIG. 2. A non-metallic front cover 219 covers the front of the master switch 104. Boss plate 251 secures the system disconnect switch 219, the toggle switch 227, and the system disconnect switch linkage 221. Toggle switch 227 includes a toggle lever 253, a compression spring 255, an electrically conductive ball bearing 257, and a pivot member 259. The toggle lever 253 contains an aperture 261 which accommodates the pivot member 259. Pivot member 259 is secured by a retainer plate 263. The retainer plate 263 contains a plurality of projections 265 which each contain apertures 266 for accommodating a pivot member 259. The retainer plate 263 is held in place by two side members 205, 207. The side members 205, 207 contain a plurality of raised projections 267 which exert compressive forces on the retainer plate 263. The side members 205, 207 are secured by back plate 203. Back plate 203 contains spring elements 204, 206, 208, 210, which exert compressive forces on side member ramps 273, 275, 277, 279.

FIG. 5 is an exploded assembly view of the slave switch shown in FIG. 3. A non-metallic cover plate 501 covers the front of slave switch 110. The cover plate 501 fits over front enclosure 301. Front enclosure 301 contains an aperture 503 for accommodating a toggle switch lever, and a battery compartment aperture 505. Cover plate holes 507, 509 accommodate fasteners or screws used to mount cover plate 501. Mounting holes 511, 513 mount the front enclosure 301 to a retainer plate 515.

Retainer plate 515 contains battery compartment walls 517, cover plate holes 519, 521, and retainer plate holes 523, 525. The retainer plate 515 contains a plurality of projections 527 which each contain apertures 529 for accommodating a pivot member 259 (FIG. 4). Pivot member 259 passes through an aperture 261 on a toggle lever 253, securing the toggle lever 253 to the retainer plate 515 (FIG. 6).

FIG. 6 is an exploded view of the retainer plate 515 toggle lever 253 assembly shown in FIG. 5. A system disconnect switch 537 situated next to toggle lever 253 permits the system to be powered down. Disconnect switch linkage 539 allows the system operator to turn the system disconnect switch 537 on and off after the cover plate 501 has been installed. The disconnect switch linkage 539 is designed to be cosmetically unobtrusive as this function is used infrequently during normal system operation.

Figure 7:
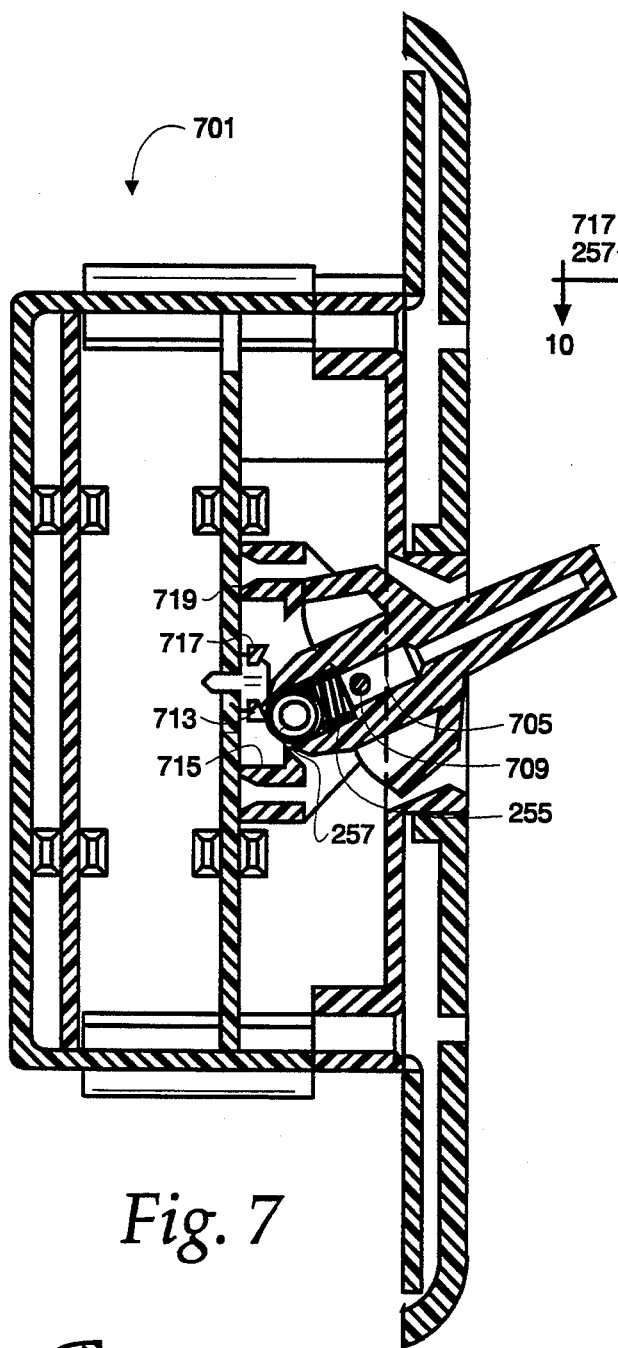
FIG. 7 is a cross-sectional view of a slave switch or a master switch with the switch in a first stable resting position.

FIG. 7 is an exploded cross-sectional view of a switching mechanism assembly 701 employed in the present invention. The switching mechanism assembly 701 may be incorporated into the master switch 104 and/or the slave switch 110. A toggle lever 253 contains an inner aperture 705. The inner aperture 705 houses a compression spring 255. For ease of assembly, an optional screw or fastener 709 may be used to secure the compression spring 255 in the inner aperture 705. Compression spring 255 applies force to a ball bearing 257G. Ball bearing 257 should have an electrically conductive surface for the switching mechanism assembly 701 to operate as intended.

FIG. 7 shows the toggle lever 253 in one of two possible stable resting positions. The ball bearing 257 rests in an aperture formed by a switch contact 713 and a lower raised projection 715. In the second resting position, the ball bearing would rest between switch contact 717 and an upper raised projection 719. However, in both resting positions, the contacts 713G, 717 are open and no current will flow from contact 713 to contact 717, or vice-versa.

Although most of the switching mechanism 701 components may be fabricated from plastic, the operational characteristics of the mechanism are enhanced if the ball bearing 257 and the compression spring 255 are made of metal. Of course, the switch contacts 713 and 717, and the ball-bearing 257 must be fabricated of metal to permit the switching mechanism to function.

Figure 8:
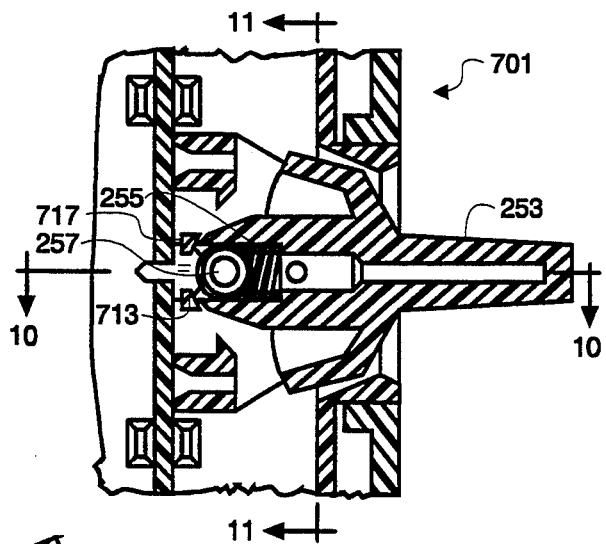
FIG. 8 is a cross-sectional view of the switch shown in FIG. 7 during activation of the switch from a first stable resting position to a second stable resting position.

FIG. 8 displays the switching mechanism assembly 701 of FIG. 7 while the switch assembly 701 is being activated. The toggle lever 253 is situated at an intermediate point between the two aforementioned stable resting positions. The compression spring 255H applies force to the ball bearing 257, which, in turn, forces the ball bearing 257 against switch contacts 713, 717. The switch contacts 713, 717 and ball bearing 257 complete an electrical circuit for a brief interval of time. Accordingly, switch assembly 701 is a momentary-contact toggle switch. However, the switch is designed to look and feel similar to a conventional 117-VAC two- or multiple position household switch.

Figure 9:
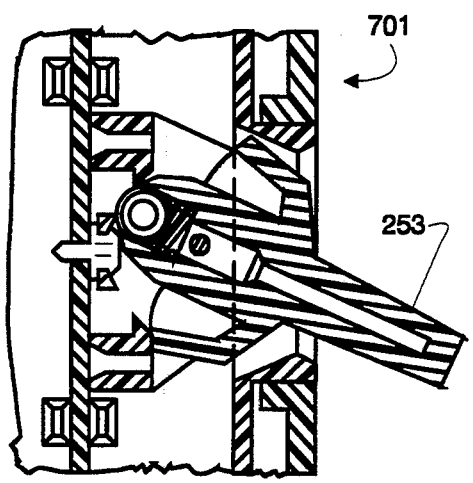
FIG. 9 is a cross-sectional view of the switch shown in FIG. 7 with the switch in a second stable resting position.

FIG. 9 illustrates the switching mechanism assembly 701 of FIG. 7 in the second resting position. Prior to activation, the toggle lever 253 is at the position indicated in FIG. 7. Upon activation, the lever 253 moves downward to reach the position shown in FIG. 8, and then travels further downward to the second resting position shown in FIG. 9 as 253. If the toggle lever 253, as shown in FIG. 9, is activated, the toggle lever 253 will travel upward to reach the position shown in FIG. 8, 253, before reaching the first equilibrium position shown in FIG. 7, 253.

Figure 10:
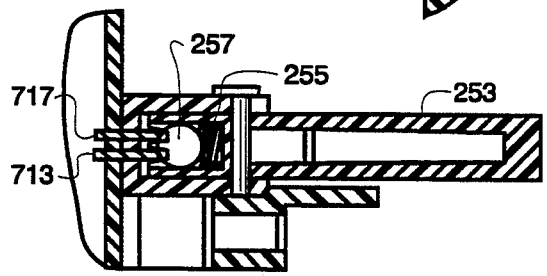
FIG. 10 is an exploded cross-sectional view of the switch contacts for the switch shown in FIG. 8.

FIG. 10 is an exploded cross-sectional view of the switch assembly shown in FIGS. 7–9 with the toggle lever 253 in the position shown at FIG. 8.

Figure 11:
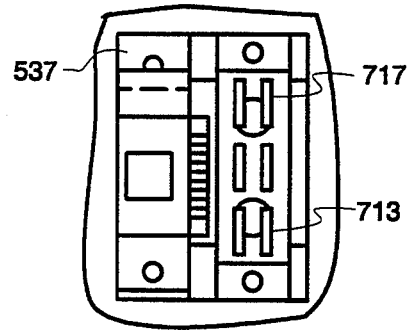
FIG. 11 is an exploded plan view of the switch contacts shown in FIG. 10 with various components removed for clarity.

FIG. 11 is an exploded plan view of the switch contacts 713, 717 with the toggle lever 253, the compression spring 255, and the ball bearing 257 removed for clarity. To the left of switch contacts 713 and 717 is the system disconnect switch 537.

Figure 12:
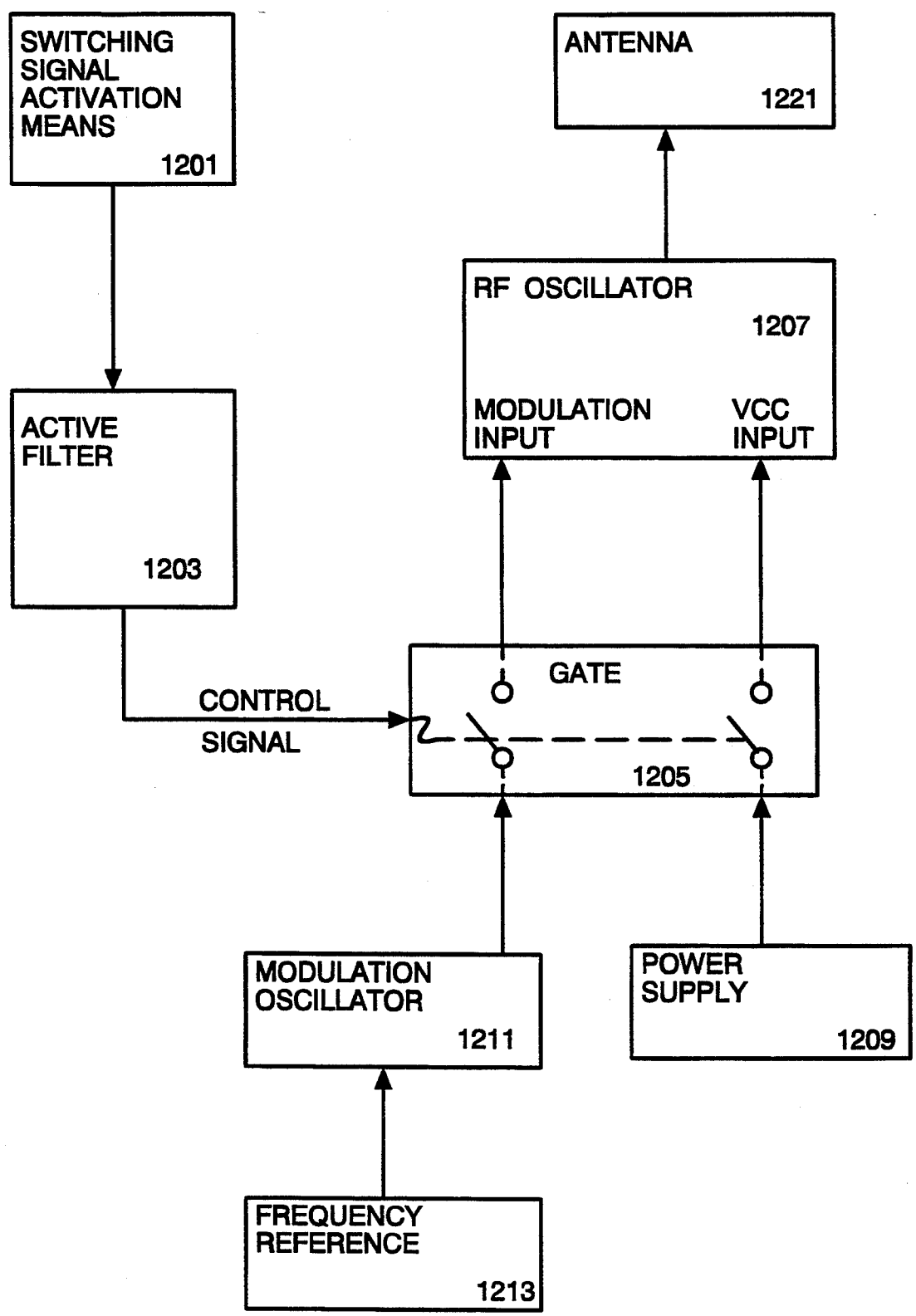
FIG. 12 is a block diagram of the electrical circuitry of the slave switch unit shown in FIG. 3.

FIG. 12 is a block diagram of the electrical circuitry of the slave switch 110 shown in FIG. 1. Switch contacts 717, 713 FIG. 7 and switching mechanism assembly 227 (FIG. 4) are configured as a single-pole, momentary-contact switch, shown at block 1201 (FIG. 12) as a switching signal activation means. An active filter 1203 is used to broaden the response time of the switching signal activation means 1201. If the switching signal activation means 1201 was configured to key an RF oscillator 1207 directly, the RF oscillator 1207 would be activated for a very brief interval of time. Consequently, switching system operation would be extremely susceptible to electrical noise. The active filter 1203 modifies the response time of the switching signal activation means 1201 to enable a gate 1205 whenever the switching signal activation means 1201 is activated. The gate 1205 is enabled for approximately one second. When the gate 1205 is enabled, power is applied to the RF oscillator 1207 from a power supply 1209. The gate 1205 may also be used to apply modulation to the RF oscillator 1207. The modulation signal may be produced by a modulation oscillator 1211. In the preferred embodiment, the frequency of the modulation oscillator is determined by a frequency reference 1213 which, for example, may be a crystal resonator operating in the range of approximately 30 kHz. If it is desired to use a plurality of switching systems in close proximity, each system can be configured to operate on a different modulation frequency by selecting appropriate crystal resonators for frequency reference 1213. The preferred embodiment operates at one of three modulation frequencies: 28 kHz, 30 kHz or 32 kHz.

RF oscillator 1207 may be configured to operate in the frequency range of 300 mHz. The oscillator may be modulated or unmodulated. For example, amplitude modulation, frequency modulation or open carrier could be employed. An output power of approximately 5 milliwatts into a 50-Ω load is provided in the preferred embodiment. The maximum permissible output power is determined by Part 15 of FCC Rules and Regulations, which sets limits on the electromagnetic field strength produced by RF-generating devices. With an output power of 5 mW and a short antenna 1221 comprised of several inches of wire, the slave switch 110 will operate in compliance with Part 15. The output of the oscillator is coupled into the antenna 1221; band pass of low-pass filters may be used to purify the transmitted signal, but are not required for the present application. The antenna 1221 may consist of a wire jumper or a printed-circuit trace running in close proximity to the tank circuit of the oscillator 1207.

Figure 13:
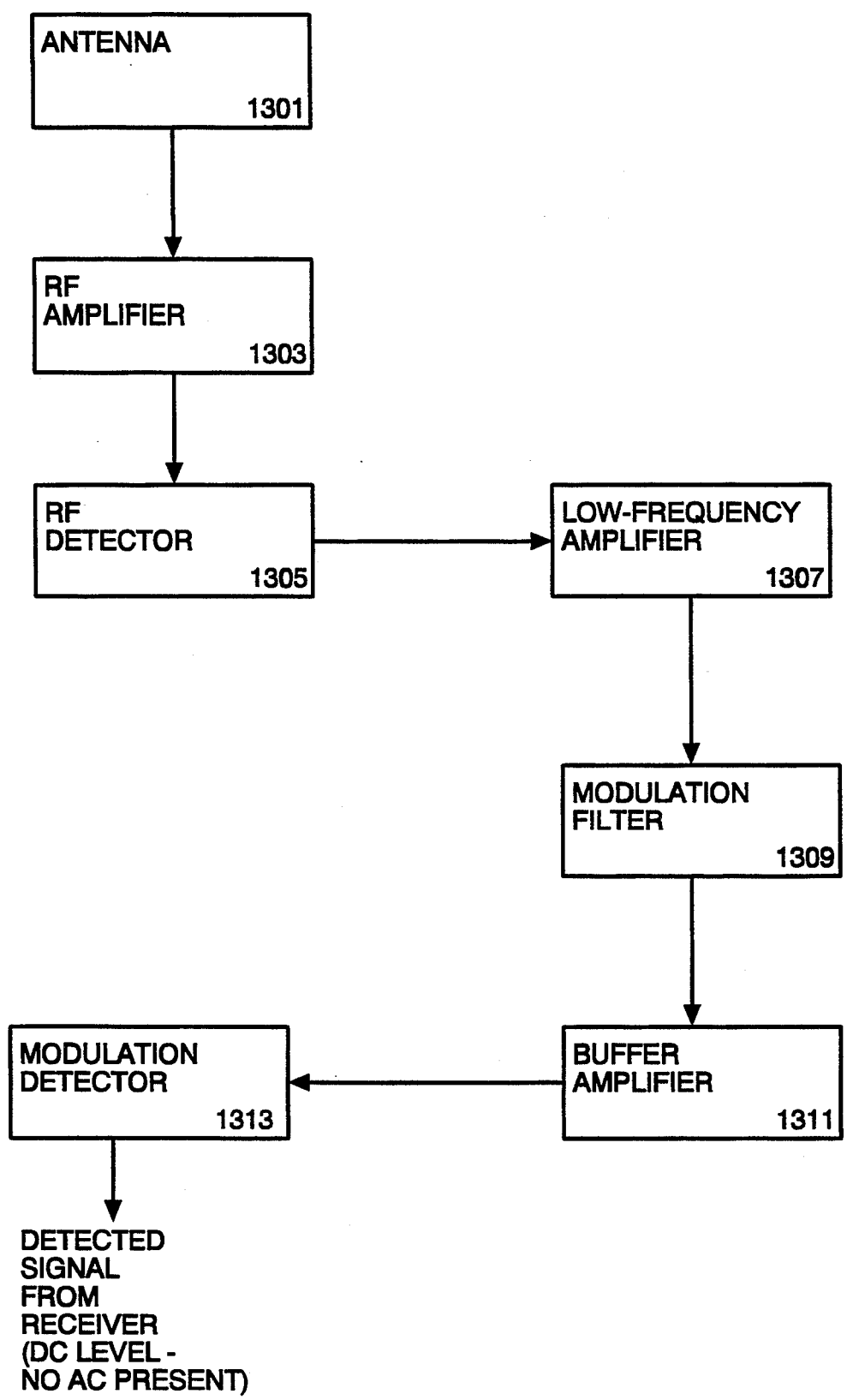
FIG. 13 is a block diagram of the signal detection circuit in the master switch.

FIG. 13 is a block diagram of a portion of the electrical circuitry of the master switch 104 illustrated in FIG. 1. An antenna 1301 is used to receive the signal from the slave switch 110. In the preferred embodiment, the antenna 1301 is a short length of wire several inches long. The signal from the antenna 1301 is fed into an RF amplifier 1303 to increase the amplitude of the signal received by the antenna 1301. After amplification, the signal is passed on to an RF detector 1305 which removes the RF carrier from the received signal. The resulting baseband signal at the output of the RF detector 1305 is fed to a low frequency amplifier 1307 and a modulation filter 1309. The modulation filter 1309 is designed to pass one or more discrete modulation frequencies. Any other frequencies which may be present are filtered out at this point. In the preferred embodiment, the modulation filter 1309 is a crystal filter which is tuned to one of three frequencies - 28 kHz, 30 kHz or 32 kHz, depending upon the desired channel of operation.

The output of the modulation filter 1309, consisting of one or more discrete demodulated frequency components, is fed to a buffer amplifier 1311. The buffer amplifier increases the amplitude of the demodulated signal so that the detected signal is of sufficient strength to drive a modulation detector 1313. Modulation detector 1313 converts the discrete frequency components at the output of buffer amplifier 1311 into a DC voltage offset. The AC component of the waveform is removed by modulation detector 1313. The DC voltage offset may be used to control logic circuitry, including TTL and/or CMOS devices.

Figure 14:
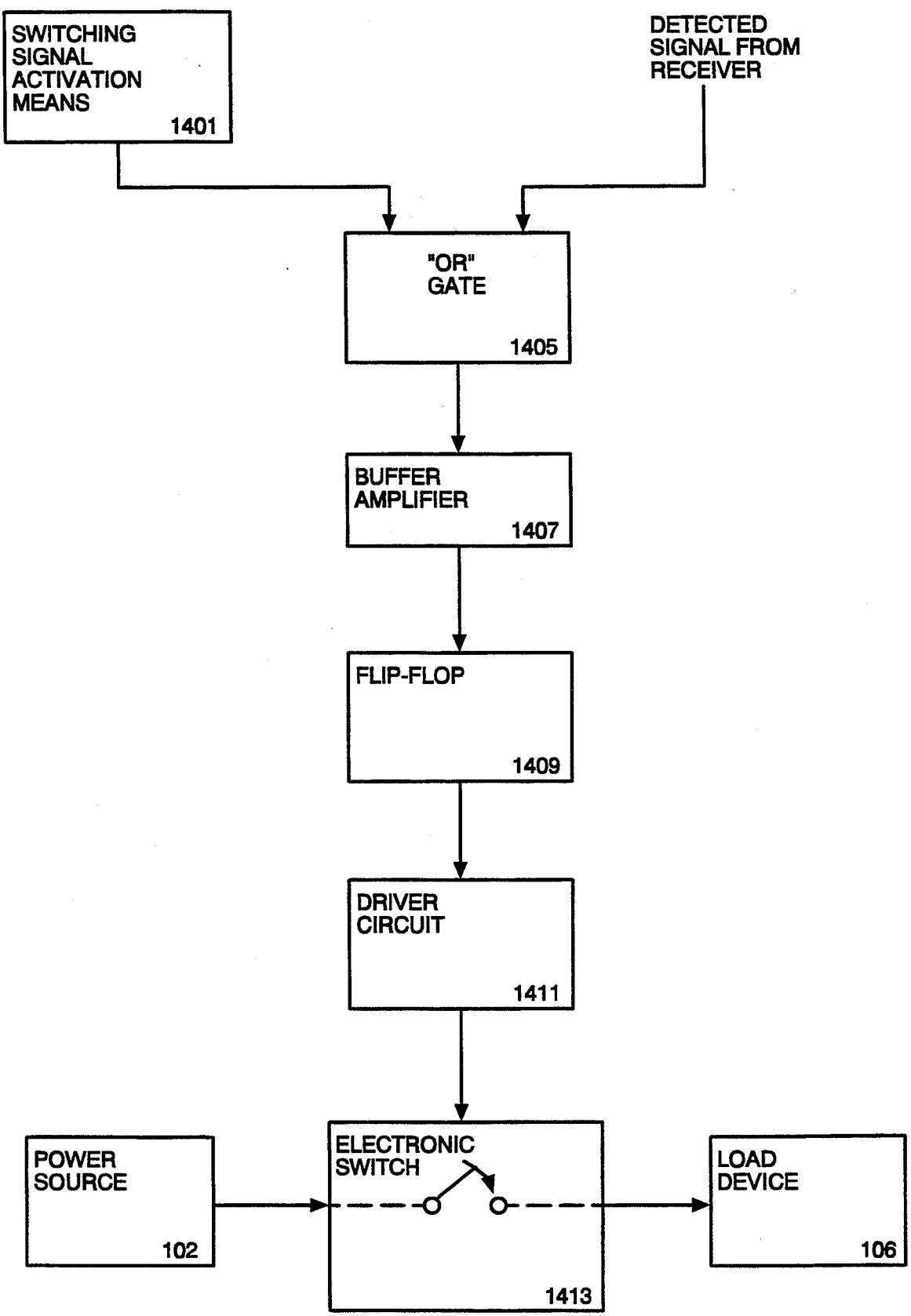
FIG. 14 is a block diagram of the switching circuit in the master switch.

FIG. 14 is a block diagram of a portion of the electrical circuitry of the master switch 104 illustrated in FIG. 1. Switch contacts 711, 713 and switching mechanism assembly 227 (FIG. 7) are configured as a single-pole, momentary-contact switch, shown as switching signal activation means 1401 (FIG. 14).

The output of the switching signal activation means 1401 is fed into a first input terminal of an OR gate 1405. The second input terminal of OR gate 1405 accepts the detected signal from the receiver (FIG. 13). The output of OR gate 1405 is processed by a buffer amplifier 1407 and the resulting signal is applied to the trigger input of a flip-flop 1409. The output of flip-flop 1409 is amplified by a driver circuit 1411 to provide sufficient current to drive high-powered semiconductor devices. In the preferred embodiment, the driver circuit 1411 drives an electronic switch 1413 which may be comprised of a DIAC, a TRIAC and related components. The electronic switch 1413 controls current flow between a power source 102 (nominally 120-VAC) and a load device 106, such as an incandescent lamp. The electronic switch 1413 is always in one of two mutually-exclusive states, ON or OFF. Whenever the trigger input of the flip-flop 1409 is activated, the electronic switch will reverse states.

Figure 15:
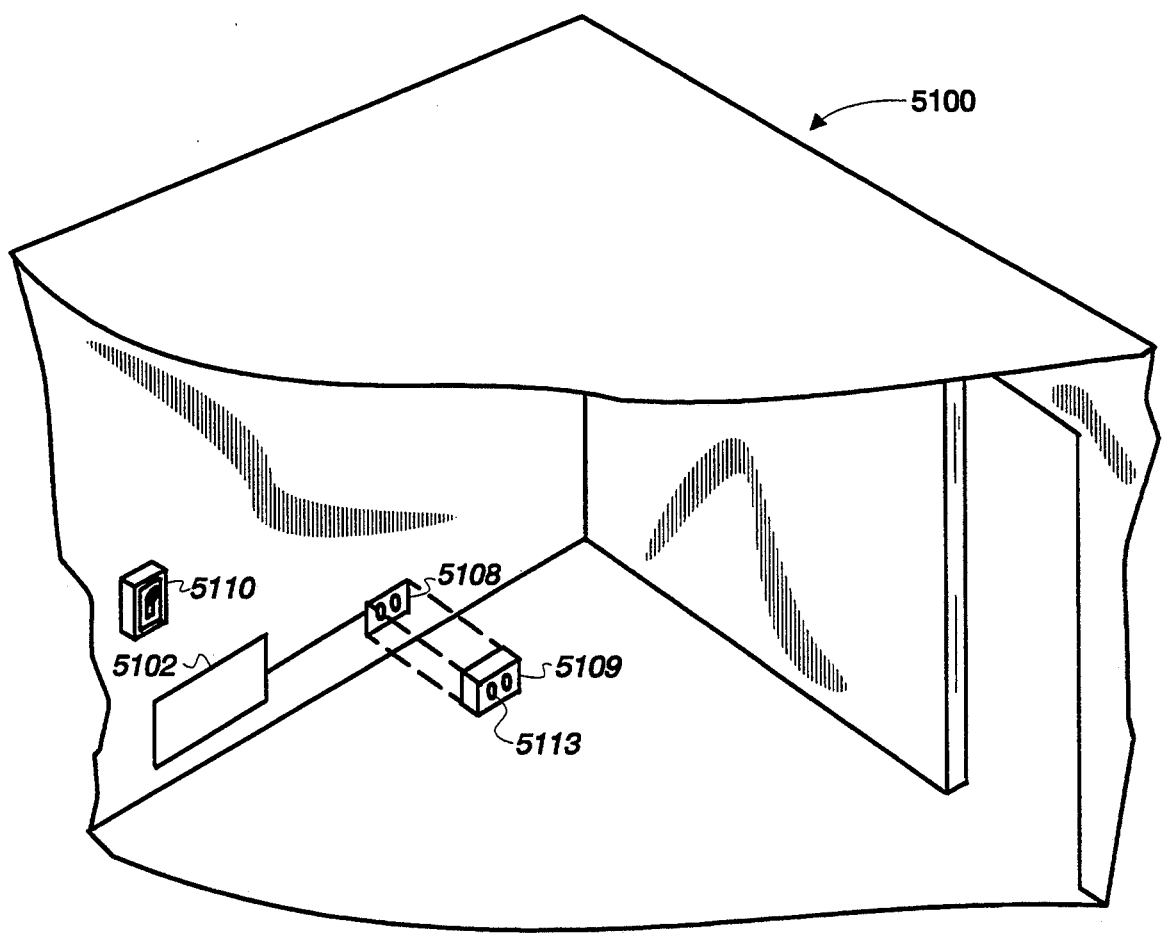
FIG. 15 is a representative pictorial view of a first alternate embodiment for the switching system of the present invention.

FIG. 15 is a pictorial representation of an alternate embodiment for the present invention. A wireless switching system 5100 is shown, including a power source 5102, a standard electrical outlet 5108, a master plug-in module 5109, and a slave switch 5110. The power source 5102 consists of 120-VAC, 50 or 60 Hz alternating current. Power source 5102 is connected to the standard electrical outlet 5108. Power to the standard electrical outlet may optionally be switched on and off by means of one or more standard electrical two-way or three-way switches. The master plug-in module 5109 functions in a manner similar to the master switch 104 shown in FIG. 1. Master plug-in module 5109 contains a receiver and an electronic switch. The receiver senses the presence of switching signals generated by a transmitter in the slave switch 5110. In response to the receipt of a switching signal, the electronic switch in the master plug-in module 5109 will reverse its state. If the electronic switch was initially in the "off" state, receipt of the switching signal will trigger the switch into the "on" state. Conversely, if the electronic switch was initially in the "on" state, the switching signal will place the switch into the "off" state.

The plug-in module 5109 contains a two-prong or three-prong plug which may be inserted into a standard electrical outlet 5108. The plug-in module 5109 contains one or more electrical outlets 5113, which each accept the standard electrical two-prong or three-prong plugs present on typical load devices, such as lamps or small appliances.

Figure 16:
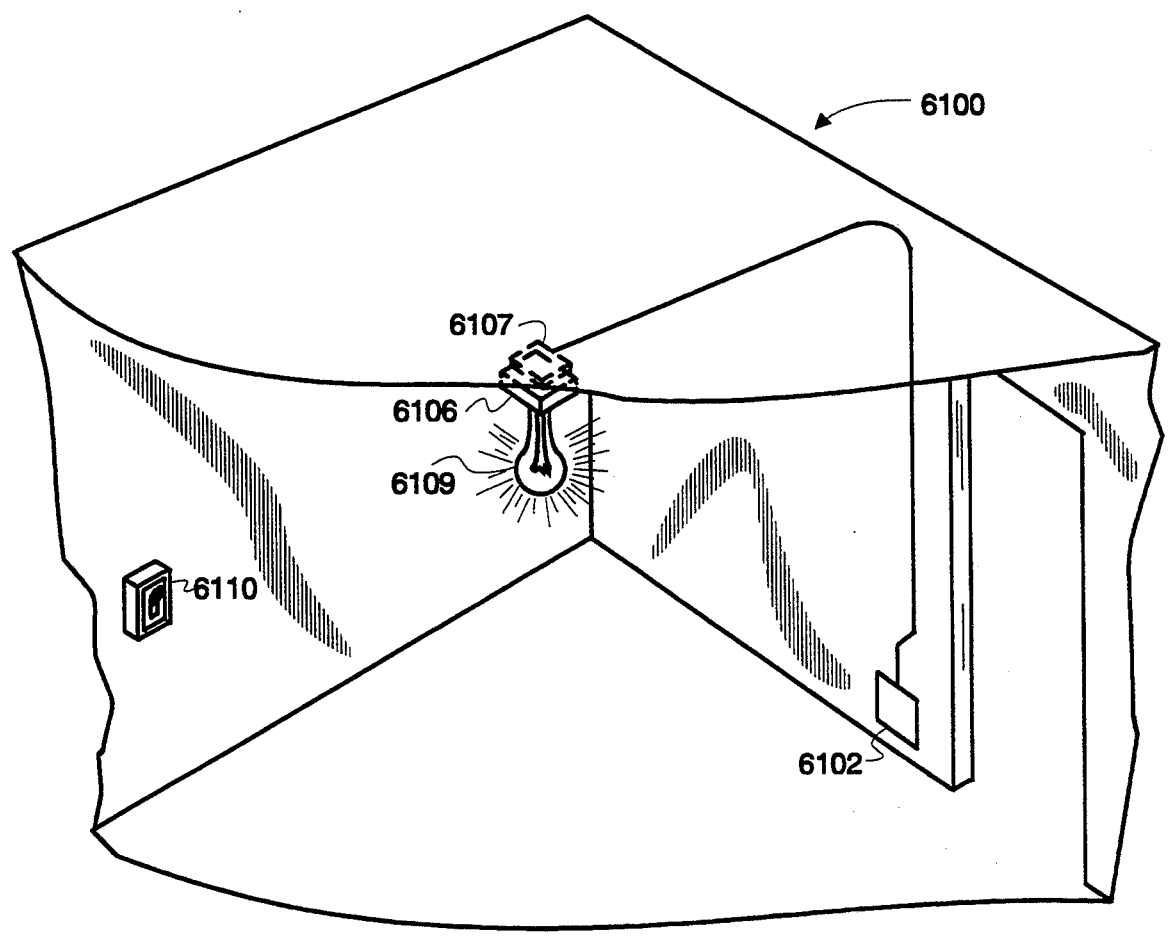
FIG. 16 is a representative pictorial view of a second alternate embodiment for the switching system of the present invention.

FIG. 16 illustrates a further alternate embodiment of the present invention. The wireless switching system 6100 includes a power source 6102, a standard light bulb socket 6107, a master screw-in module 6106, a load device 6109 and a slave switch 6110. The power source 6102 consists of 120-VAC, 50 or 60 Hz alternating current. Power source 6102 is connected to the standard light bulb socket 6107. Power to the standard light bulb socket may optionally be switched on and off by means of one or more standard electrical two-way or three-way switches. The master screw-in module 6109 functions in a manner similar to that of master switch 104 shown in FIG. 1 or plug-in module 5109 shown in FIG. 15. Master screw-in module 6109 contains a receiver and an electronic switch. The receiver senses the presence of switching signals generated by a transmitter in the slave switch 6110. In response to the receipt of a switching signal, the electronic switch in the master screw-in module 6109 will reverse its state. If the electronic switch was initially in the "off" state, receipt of the switching signal will cause the switch to enter the "on" state. Conversely, if the electronic switch was initially in the "on" state, the switching signal will place the switch into the "off" state.

The switching system provides a relatively simple installation procedure, which is readily implemented by a typical homeowner or layman having no special skills. The only tool need to install the switching system is a flat-bladed screwdriver. A wall switch location that controls an outlet to a lamp or overhead incandescent light is selected. The total lighting load must not exceed 500 watts. The master switch must be able to easily detect the signals from the slave switch in the room or hallway where the system is installed so that the system will operate properly. Large metal objects should not be situated between the two switches. Otherwise, the switching signals may be attenuated, substantially reducing the operational range of the system.

Power to the light switch circuit should be turned off before installing the master switch. This should be done at the circuit breaker or fuse box. The master switch replaces a conventional two-way switch. The existing switch is removed and its wires are disconnected. The screws may be saved for installation of the master switch. Some local building codes may require the switching system to be installed by a qualified electrician.

Either wire coming from the master switch may be connected to either wire coming from the wall box. One of the wire connectors supplied with the switching system may be used to secure the wires. The remaining wire coming from the master switch is connected to the other wire coming from the wall box. The wire connections should be checked to make sure they are secure and no bare wires are exposed. The two screws removed earlier may be used to mount the master switch to the wall box. The excess wiring should be placed into the wall box at this time. The wires may require forming to fit inside the box. The switch plate will be mounted later.

Power to the light switch circuit is turned on at the circuit breaker or fuse box. The master switch system disconnect switch, located beside the toggle switch, is positioned to its ON (up) position. If the switching system has been connected to a switched electrical outlet as opposed to a hard-wired light fixture, a lamp may be connected to the switched outlet, the lamp's switch should be turned on.

The battery clips coming from the slave switch are snapped over the terminals of a 9-volt battery and the battery is placed into its compartment. The slave switch is held at the desired mounting location and switched on. The light should turn on immediately. After one second has elapsed, the slave switch may be switched off, in which case the light should turn off. This procedure may be repeated several times to ensure that the system is functioning properly. At least one second should elapse before the slave switch is toggled, otherwise the switch will not work properly. If the light turns on intermittently or does not turn on at all, the antenna on the master switch should be removed from its track and positioned inside the wall so that it hangs down. This will increase the range of the master switch and allow it to turn on the light more readily. The slave switch may be repositioned at the desired location to make sure it operates the light. If necessary, the receiving antenna may be repositioned until the light works properly.

The slave switch may be mounted at the desired location with screws or double-stick tape. The wall plate removed earlier may be mounted over the slave switch with screws. A wall plate may be mounted over the master switch with the screws removed earlier. This completes the installation.

What is claimed is:

1. A two-position switch comprising:

a ball bearing having an electrically conductive surface;

a compression spring;

a set of electrical contacts; and activation means including a toggle lever for activating said switch; said toggle lever having a first stable non-conductive resting position and a second stable non-conductive resting position, said activation means activated by moving said toggle lever from said first stable non-conductive resting position to said second stable non-conductive resting position, said activation means activated by moving said toggle lever from said second stable non-conductive resting position to said first stable non-conductive resting position;

said toggle lever further including a compression spring aperture for accommodating said compression spring, said compression spring situated within said compression spring aperture and applying a force to said ball bearing such that said ball bearing momentarily rests across said set of contacts when said activation means is activated, to momentarily complete an electrical circuit across said contacts.

2. A two-position switch as set forth in claim 1 wherein said ball bearing, said compression spring, and said set of contacts are fabricated of metal, and all remaining components are fabricated from plastic.

3. A two-position switch as set forth in claim 1 further including current source means for applying a low-voltage direct current across said contacts, and current sensing means for sensing whether or not said contacts have been momentarily closed.

4. A two-position switch as set forth in claim 1 wherein said activation means requires the application of a force similar in magnitude to the force required to activate a standard household light switch.

5. A two-position switch as set forth in claim 2 wherein said movement of said toggle lever from said first position to said second stable resting position requires the application of a force similar in magnitude to the force required to activate a standard household light switch.

6. A two-position switch as set forth in claim 1 wherein said toggle lever is fabricated of plastic.

7. A two-position switch as set forth in claim 1 wherein the color of said toggle lever is selected from the group consisting of white, ivory, black and brown.

* * * * *